United States Patent [19]

Ward et al.

[11] 3,898,363

[45] Aug. 5, 1975

[54] FIBER-ELASTOMER BONDING USING BISIMIDE ADHESIVES

[75] Inventors: Robert A. Ward, Scotia; John T. Hoback, Schenectady, both of N.Y.

[73] Assignee: General Electric Company, Schenectady, N.Y.

[22] Filed: Apr. 18, 1973

[21] Appl. No.: 352,111

Related U.S. Application Data

[63] Continuation of Ser. No. 138,271, April 28, 1971, abandoned.

[52] U.S. Cl. ............ 428/474; 156/110 A; 156/331; 428/435; 428/458
[51] Int. Cl.² B32B 25/02; B32B 17/04; B32B 15/02
[58] Field of Search ............ 117/80, 47 R, 126 GQ; 156/110 A, 308, 331; 161/93, 227, 197, 214; 260/47 R, 47 UA, 78 UA

[56] References Cited

UNITED STATES PATENTS

| | | | |
|---|---|---|---|
| 3,316,212 | 4/1967 | Angelo et al. | 161/197 X |
| 3,562,223 | 2/1971 | Bargain et al. | 161/227 X |
| 3,658,764 | 4/1972 | Bargain et al. | 260/78 UA |
| 3,661,623 | 5/1972 | Bhakuni et al. | 117/76 T |
| 3,740,378 | 6/1973 | Crivello | 260/78 UA |

*Primary Examiner*—Charles E. Van Horn
*Assistant Examiner*—Robert A. Dawson

[57] ABSTRACT

Improved adhesives and adhesion promoters are provided by aliphatically unsaturated bisimides and reaction products of such bisimides with organic diamines.

9 Claims, No Drawings

FIBER-ELASTOMER BONDING USING BISIMIDE ADHESIVES

This is a continuation of application Ser. No. 138,271, filed Apr. 28, 1971 and now abandoned.

This invention relates to the adhesion of materials and to the promotion of adhesion. More particularly, it relates to improved adhesion which is obtained by the treatment of one or more adherends, with aliphatically unsaturated bisimides or the reaction products of such bisimides with organic diamines or mixtures of such materials.

Adhesion between discrete materials has been the subject of much study. Where true bonding or adhesion is not achieved, separation of the materials normally occurs in the interface. It is normally desirable and often necessary that materials be so completely bonded that any failure takes place within the bonded materials themselves and only if applied physical stresses exceed the strength of the materials. At stresses less than the actual rupture force of the materials, a truly bonded composite performs according to the particular properties of one or both materials and application design need not compensate or compromise for interface operation or failure.

In the past it has been usual in improving the adhesion of materials to use primers or surface preparation applied to one or more surfaces desired to be cohered or to provide bridging materials which present a discrete third layer between the materials to be bonded. Generally speaking, such tie coats or primers must be specifically designed for the materials involved and they often have a limited shelf or storage life. Further, such primer surface treatments or bridging agents generally act on the surfaces of the materials only and do not become an integral part of the materials being bonded. They thus do not become a part of a continuous structure.

It has been unexpectedly found that bisimides of the type described herein and reaction products of such bisimides and organic diamines provide superior adhesives, primers, or tie coats for similar or dissimilar materials, such adhesives or primers often migrating into the materials adjacent to the bond and providing a composite structure which fails only as a result of the failure of one or more of the bonded materials themselves as opposed to failure of the discrete adhesive layer which is most often the case.

Those features of the invention which are believed to be novel are set forth with particularity in the claims appended hereto. The invention will, however, be better understood and further objects and advantages appreciated from a consideration of the following description.

It has been found that N,N'-bisimides of aliphatically unsaturated organic anhydrides having the general formula

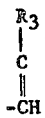

where $R_1$ is selected from the group consisting of an ethylene residue, an alkyl residue, an aryl residue, a cyclohexyl residue, at least two aryl residues bonded to one another through at least one of the following radicals: $-CH_2-$, $-SO_2 13$, and $-O-$, or at least two cyclohexyl residues bonded to one another through a $-CH_2-$ radical, and wherein $R_2$ is a radical of the structure

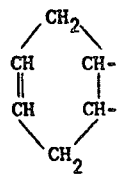

wherein $R_3$ is H or $CH_3$, are useful in the present respect.

Such bisimides are set forth in U.S. Pat. No. 3,380,964, Apr. 30, 1968, included herein by reference.

Also useful in connection with the present invention are imide group containing materials which are obtained by reacting bisimides of aliphatically unsaturated dicarboxylic acids with organic diamine or polyamine. Such materials are set forth in U.S. Pat. No. 3,562,223, Feb. 9, 1971, incorporated herein. Briefly, according to this patent, N,N'-bisimides of aliphatically unsaturated dicarboxylic acids are reacted with a primary amine to provide prepolymer materials having improved thermal characteristics in their fully cured state. More specifically, a bisimide having the formula $$D \diagdown \!\!\!\! \begin{array}{c} CO \\ \\ CO \end{array} \!\!\!\! \diagup N\text{-}A\text{-}N \diagdown \!\!\!\! \begin{array}{c} CO \\ \\ CO \end{array} \!\!\!\! \diagup D$$

in which D is a divalent radical containing a double carboncarbon bond and A is a divalent radical containing at least two carbon atoms is reacted with a primary diamine of the formula $$H_2N - B - NH_2$$

in which B is a divalent radical having not more than 30 carbon atoms. A and B can be identical or different and may be a linear or branched alkylene radical having less than 13 carbon atoms, a cycloalkylene radical having in the ring 5 or 6 carbon atoms, a heterocyclic radical containing at least one of the atoms O, N, or S, an aromatic or polycyclic aromatic radical, these various radicals having no substituents which provide side reactions under operating conditions. A and B can also be polyaromatic or polyalicyclic radicals bonded together with divalent groups or atoms such as oxygen or sulfur, alkylene groups having from 1 to 3 atoms of carbon, the radicals $-NR_4-$, $-P(O)R_3-$, $-N=N-$, $$\begin{array}{c} -N\!=\!N-; \\ \downarrow \\ O \end{array}$$

$-CO-O-$, $-SO_2-$, $-SiR_3R_4-$, $-CONH-$, $-NY-CO-X-CO-NY-$, $-O-CO-X-CO-O-$,

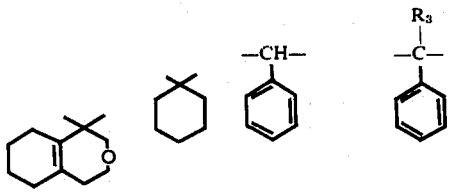

in which $R_3$, $R_4$ and Y represent an aliphatic radical having from 1 to 4 atoms, carbon or a cycloaliphatic radical having 5 or 6 atoms of carbon in the aromatic or polyaromatic ring and X represents an alkylene substituted or unsubstituted radical having less than 13 carbon atoms, a cycloaliphatic radical having 5 or 6 carbon atoms in the ring or a monoor polycyclic aromatic radical.

The group D is derived from an ethylenic anhydride with the general formula

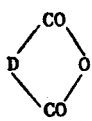

which may be, for instance, maleic anhydride, citraconic anhydride, tetrahydrophthalic anhydride, itaconic anhydride, as well as the products of the Diels-Alder reaction between a cyclodiene and one of these anhydrides.

Among the type (I) N,N'-bisimides that may be used are the following:
N,N'-ethylene-bismaleimide
N,N'-hexamethylene-bismaleimide
N,N'-metaphenylene-bismaleimide
N,N'-4,4'-diphenylmethane-bismaleimide
N,N'-4,4'-diphenylether-bismaleimide
N,N'-4,4'-diphenylsulfone-bismaleimide
N,N'-4,4'-dicyclohexylmethane-bismaleimide
N,N'-α-α-4,4'-dimethylene cyclohexane-bismaleimide
N,N'-metaxylylene-bismaleimide
N,N'-4,4'-diphenylcyclohexane-bismaleimide The following are examples of the type (II) diamines which may be used:
diamino-4,4'-dicyclohexylmethane
diamino-1,4-cyclohexane
diamino-2,6-pyridine
metaphenylene diamine
paraphenylene diamine
diamino-4,4'-diphenylmethane
bis(amino-4-phenyl)-2,2-propane
benzidine
diamino-4,4'-phenyl oxide
diamino-4,4'-diphenyl sulfide
diamino-4,4'-diphenylsulfone
bis(amino-4-phenyl) diphenyl silane
bis(amino-4-phenyl)methylphosphine oxide
bis(amino-3-phenyl)methylphosphine oxide
bis(amino-4-phenyl) phenylphosphine oxide
bis(amino-4-phenyl)phenylamine
diamino-1,5-naphthalene
metaxylene diamine
paraxylene diamine
bis(paraaminophenyl)-1,1 phthalene
hexamethylene diamine Piperazine is also useful. Also useful are polyamines in general including, among others, polymethylene polyamine.

According to the preceding patent, the amounts of N,N'-bisimides and diamines are chosen so that the ratio of the number of moles of N,N'-bisimides to the number of moles of diamine is at least equal to one but it is generally preferable that it be less than 50. Any of the usual solvents can be used.

The present adhesives or adhesion promoters can be used in connection with any of a number of materials including the usual natural or synthetic elastomeric materials or rubbers including but not limited to ethylene-propylene copolymers, diene-modified ethylene-propylene, butadiene polymers, natural rubber, synthetic polyisoprene, isobutylene-isoprene copolymers, polychloroprene and other halogenated elastomers, polysiloxanes, butadiene-acrylonitrile copolymers, and chloro-sulfonated polyethylene elastomers and styrene-butadiene copolymers. Others will occur to those skilled in the art. Generally, any of the elastomeric materials are useful in connection with the invention.

There were prepared a number of elastomeric compositions consisting, as shown in Table 1 below, of by weight gum with a filler such as talc, carbon black, Agerite D, or polymerized trimethyldihydroquinoline as an antioxidant and Dicup 40c as a peroxide curing material. Other typical antioxidant materials are listed beginning at page 840 of *Modern Plastics Encyclopedia*, Volume 47, No. 10a, 1970–71, McGraw Hill, Inc., New York, N.Y. Other typical peroxides beside Dicup 40c peroxide which normally contains about 40 percent active material, specifically di-alpha-cumyl peroxide, are listed beginning at page 847 of the above cited *Modern Plastics Encyclopedia* and U.S. Pat. Nos. 2,888,424; 2,826,570, and elsewhere.

Also included in the compositions were the indicated amounts of bisimide or reaction product of bisimide and diamine. Specifically, the bisimide used was the bismaleimide of methylene dianiline taught in the above referenced U.S. Pat. No. 3,380,964 and the bisimide diamine reaction product was the prepolymer of Example 6 of the above referenced U.S. Pat. No. 3,562,223.

Vistalon 6504 is a terpolymer of ethylene, propylene and a non-conjugated diene. CIS, 4PBD indicates a homopolymer of polybutadiene, Butyl 150 is a copolymer of polyisobutylene and isoprene known as butyl rubber and GRS 1022 is a copolymer of styrene and butadiene. Pale crepe is natural rubber.

Typical rubber compounding ingredients which can be used are the usual process aids, extending oils, waxes and the like to develop specific desired properties for processing or vulcanization. Other typical filler materials such as silicas, clays, aluminum hydrate, carbonates, silicates and carbon blacks may be used alone or in combination.

TABLE I

| Composition | Parts By Weight | A | B | C | D |
|---|---|---|---|---|---|
| Gum | 100 | Vistalon 6504 | Vistalon 6504 | CIS, 4 PBD | CIS, 4 PBD |
| Talc | 75 | — | — | — | — |
| Carbon Black | 3 | — | — | — | — |
| Agerite D | 1 | — | — | — | — |
| Dicup 40C | Variable | 3.45 | 3.45 | 3.45 | 3.45 |
| Bisimide | Variable | 0 | 5. | 0 | 0 |
| Bisimide + Diamine | Variable | 0 | 0 | 0 | 5. |

| Composition | Parts By Weight | E | F | G | H |
|---|---|---|---|---|---|
| Gum | 100 | Pale Crepe | Pale Crepe | GRS 1022 | GRS 1022 |
| Talc | 75 | — | — | — | — |
| Carbon Black | 3 | — | — | — | — |
| Agerite D | 1 | — | — | — | — |
| Dicup 40C | Variable | 3.45 | 3.45 | 3.45 | 3.45 |
| Bisimide | Variable | 0 | 0 | 0 | 0 |
| Bisimide + Diamine | Variable | 0 | 5. | 0 | 5. |

While the adhesive materials of the present invention are particularly useful in bonding together or promoting the adhesion of layers of elastomers and reinforcing material such as glass fiber and fabric, asbestos, natural or synthetic fiber, inorganic fiber, metal fibers, such as stainless steel, etc. and the like, they are generally useful for adhering together any similar or dissimilar materials which it is desired to bond into a unitary structure.

The following examples illustrate the practice of the present invention, it being realized that they are not to be taken as limiting in any way.

EXAMPLE 1

A sheet of uncured elastomeric material A about 20 mils thick was laid up with one layer of glass fabric, 9.0 mils thick, the individual fibers having an aminosilane primer, and cured for 60 minutes at 180°C at a pressure of 500 psi. The laminate was tested by applying a 90° peel of the rubber layer from the glass fabric. Microscopic examination showed no bond between the elastomeric material and the glass fabric but a mechanical entrapment only of the elastomeric material within the glass cloth with considerable distortion of the glass fabric and the fibers therein. Next, a layer of glass fabric as above was coated and impregnated with a solution of the resin of Example 6 of the above U.S. Pat. No. 3,562,223 and dried to a resin content of 32 percent by weight. This treated glass fabric was then used as the substrate for a layer of material A as above, the laid up material being cured for 60 minutes at 180°C and 500 psi. Failure upon peeling as above took place within the elastomer. Microscopic examination of the interlayer of this material showed an intimate bonding between the elastomeric material and the glass fabric as opposed to the above mechanical entrapment when the present imide material was not used. Similar results were obtained when the layer of glass fabric was treated with a solution of the same resin to provide approximately a 4 percent resin content.

EXAMPLE 2

Example 1 was repeated using elastomeric material B above containing 5 percent of bisimide. Once again, when this material was laminated with one layer of the above glass fabric and cured for 60 minutes at 180°C at a pressure of 500 psi, microscopic examination of the interlayer showed no mechanical bond between the elastomeric material and the glass fabric. When this elastomeric material was adhered to a prepreg of one layer of the above glass fabric having a 32 percent content of the above bisimide reaction product of U.S. Pat. No. 3,562,223, the resultant laminate cured as above was firmly bonded with failure under stress in the elastomeric material itself. Microscopic examination of the layers showed intimated adhesion between the elastomeric material and the glass fabric. Similar results were obtained when the glass fabric was washed with a solution of the same resin to provide a 4 percent resin content and then laminated as above.

EXAMPLE 3

A layer of elastomeric material C was laid up as in Example 1 with one layer of the above glass fabric which had been treated to contain 2 percent by weight after drying of the above bisimide-diamine reaction of U.S. Pat. No. 3,562,223. After curing the laminate consisting of two outer layers of the elastomer and one interlayer of the treated glass fabric for 10 minutes at 180°C and a pressure of 500 psi, the resultant laminate when stressed or pulled apart failed within the elastomeric material. Further, microscopic examination of the glass interlayer showed an intimate bonding of the glass fabric to the elastomeric material. Similar results were obtained when the glass fabric was impregnated to the extent of about one percent by weight content of the above resin of U.S. Pat. No. 3,380,964, the bismaleimide of methylene dianiline.

EXAMPLE 4

Example 3 was repeated in toto using as the elastomeric material that of D above. Once again, when laminates were laid up as in Example 3, the bonding of the elastomeric material to the glass fabric was intimate and strong, with failure upon physical testing being within the elastomeric material itself rather than in the glass fabric-elastomer interlayer or adhesive.

EXAMPLE 5

Example 3 was repeated in toto using as the elastomeric material that of E above, once again producing laminates as similar to those of Example 3 wherein any rupturing failure was in the elastomeric material.

EXAMPLE 6

Example 3 was repeated in toto using as the elastomeric layer material F above. Results similar to those of Example 3 were obtained when similar tests were made, that is, failure upon forced physical parting occurred within the elastomeric material only.

EXAMPLE 7

Example 3 was repeated in toto using as the material of the elastomeric layer material G above. Again, when laminations similar to those of Example 3 were prepared and tested, failure occurred only in the elastomeric layer.

EXAMPLE 8

Example 3 was repeated in toto using the elastomeric material H above as the outer laminate layers. When laminates similar to those of Example 3 were prepared, failure occurred in the elastomeric layer as opposed to the glass fabric layer or adhesive.

It will be seen from a consideration of the above examples that there are provided by the present invention adhesive or primer materials which are capable of promoting stable bonds between other materials such as elastomeric or rubber-like bodies. Whereas when usually treated glass fabric was used as the interlayer as in Examples 1 and 2 above, failure of the laminate occurred within the interlayer; when the glass fabric was treated with the materials of the present invention either in relatively large amounts to form a typical prepreg or even in smaller amounts such as essentially to prime or tie coat the glass, failure of the resulting laminate occurred only within the elastomeric material itself.

There are provided, then, by the present invention adhesives and adhesion promoting materials which represent a substantial improvement in the preparation of composite structures. The present materials find use in any application where a strong bond is required between similar or dissimilar materials. It is particularly useful in composite structures such as vehicle tires and the like for integrally bonding reinforcing fibers or fabrics to the elastomeric layers in the tire carcass. Such use in tires, drive belts, vibration dampening structures, or in any composite structures assures that failure will occur only at random throughout the elastomeric or base structure material itself rather than as a more or less uniform and wide-spread failure between the elements of the structure which are adhered together.

What we claim as new and desire to secure by Letters Patent of the United States is:

1. A process for bonding at least one fibrous layer to at least one elastomer layer which comprises treating such fibrous layer with material selected from (a) aliphatically unsaturated bisimide having the formula

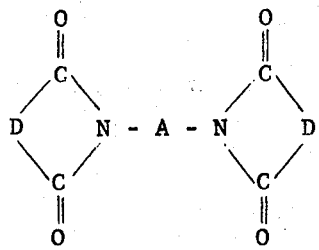

in which D is a divalent radical containing a double carbon-carbon bond and A is a divalent radical containing at least 2 carbon atoms and (b) reaction products of (a) and diamine having the formula

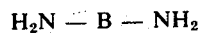

in which B is a divalent radical having not more than 30 carbon atoms and bonding said treated fibrous layer to said elastomer layer under heat and pressure.

2. The process of claim 1 wherein said fibrous layer comprises glass.

3. The process of claim 1 wherein said fibrous layer comprises glass fabric.

4. The process of claim 1 wherein said fibrous layer comprises synthetic fiber.

5. The process of claim 1 wherein said fibrous layer comprises inorganic fiber.

6. The process of claim 1 wherein said fibrous layer comprises metallic fiber.

7. The process of claim 1 wherein said treating comprises coating the surface of the fibrous material.

8. The process of claim 1 wherein said treating comprises coating and impregnating said fibrous material to produce a prepreg.

9. The structure produced by the process of claim 1.

* * * * *